(12) United States Patent
Nakayama et al.

(10) Patent No.: US 7,906,958 B2
(45) Date of Patent: Mar. 15, 2011

(54) ELECTROMAGNETIC INDUCTION TYPE ENCODER

(75) Inventors: Kenichi Nakayama, Miyazaki-gun (JP);
Osamu Kawatoko, Kawasaki (JP);
Hiroto Kubozono, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 252 days.

(21) Appl. No.: 12/320,695

(22) Filed: Feb. 2, 2009

(65) Prior Publication Data

US 2009/0195241 A1 Aug. 6, 2009

(30) Foreign Application Priority Data

Feb. 4, 2008 (JP) .................................. 2008-023507

(51) Int. Cl.
*G01B 7/14* (2006.01)
(52) U.S. Cl. .............................. 324/207.22; 324/207.15
(58) Field of Classification Search ......... 324/207.15–207.19, 256–258; 336/45; 340/870.31
See application file for complete search history.

(56) References Cited

U.S. PATENT DOCUMENTS

2003/0080733 A1  5/2003  Miyata et al.

FOREIGN PATENT DOCUMENTS

| EP | 0 337 939 A2 | 10/1989 |
| JP | A-10-318781 | 12/1998 |
| JP | A-2003-121206 | 4/2003 |

*Primary Examiner* — Bot L LeDynh
(74) *Attorney, Agent, or Firm* — Oliff & Berridge, PLC

(57) ABSTRACT

The invention provides a highly accurate and inexpensive electromagnetic induction type encoder capable of acquiring strong signal intensity with the offset reduced by a short scale coil, and is durable against fluctuations in the yaw direction, which includes a number of scale coils 14 arrayed on a scale 10 along the measurement direction, and transmitting coils 24 and receiving coils 20 that are disposed on a grid 12 relatively movably in the measurement direction with respect to the scale, and which detects a relative movement amount of the scale and the grid from changes in magnetic fluxes detected by the receiving coils via the scale coil when the transmitting coils are magnetized, wherein a plurality of sets of the transmitting coils (24A, 24B), the receiving coils (20A, 20B) and the scale coils (14A, 14B) are disposed symmetrically with respect to the center of the scale, and scale coils of one set located at a symmetrical position around the center of the scale is disposed with ½ phase of the scale pitch shifted with respect to scale coils of the other set.

10 Claims, 7 Drawing Sheets

(A) Signal of receiving coil 20A (B) Signal of receiving coil 20B (C) (C)=(A)+(B)

(A) Signal of receiving coil 20A (B) Signal of receiving coil 20B (C) (C) = (A) + (B)

ELECTROMAGNETIC INDUCTION TYPE ENCODER

CROSS-REFERENCE TO RELATED APPLICATION

The disclosure of Japanese Patent Application No. 2008-23507 filed on Feb. 4, 2008 including specifications, drawings and claims is incorporated herein by reference in its entirety.

BACKGROUND OF THE INVENTION

1. Field of the Invention

The present invention relates to an electromagnetic induction type encoder, and in particular to a highly accurate and inexpensive electromagnetic induction type encoder that is preferably used for calipers, indicators, linear encoders, micrometers, etc., and is capable of obtaining strong signal intensity with offset reduced by a short scale coil, and is durable against fluctuations in the yaw direction.

2. Description of the Related Art

As has been described in Japanese Published Unexamined Patent Application No. H10-318781 (hereinafter, referred to as Patent Document 1) and Japanese Published Unexamined Patent Application No. 2003-121206 (in particular, FIG. 1, FIG. 2, and FIG. 3) (hereinafter, referred to as Patent Document 2), as an example of Patent Document 2 shown in FIG. 1, such an electromagnetic induction type encoder has been known, which includes a number of scale coils 14,16 arrayed on a scale 10 along the measurement direction, and transmitting coils 24,26 and receiving coils 20, 22 disposed on a grid (may be referred to as a slider, too) 12 relatively movable in the measurement direction with respect to the scale 10, and is capable of detecting a relative movement amount of the scale 10 and the grid 12 from changes in magnetic fluxes detected by the receiving coils via the scale coils when the transmitting coils are magnetized. In the drawing, reference numeral 28 denotes a transmission control portion, and reference numeral 30 denotes a receiving control portion.

Where offset being excessive signals is in an attempt to be reduced in such an electromagnetic induction type encoder, as shown in FIG. 2, the offset has been reduced by disposing the receiving coils 20 at a portion (that is, in the example of FIG. 2, the middle part between both side transmitting coils) where the magnetic fields generated by the transmitting coils 24 are cancelled and is substantially brought to zero. Also, in Patent Document 2, the second receiving coils 22 are also disposed at both sides of the second transmitting coil 26 as shown in FIG. 3, in addition to such a configuration composed of the first transmitting coils 24 in FIG. 2 and the first receiving coil 20 therein.

However, with the configuration, three rows of scale coils are required, wherein there arises a problem in that, since the wiring of the scale coils is lengthened, induction current generated attenuates due to impedance of the scale coil itself and intensive signals are hardly obtained.

SUMMARY OF THE INVENTION

The present invention was developed to solve such a problem in the prior art, and it is therefore an object of the invention to provide a highly accurate and inexpensive electromagnetic induction type encoder that is capable of obtaining strong signal intensity with offset reduced by a short scale coil, and is durable against fluctuations in the yaw direction.

The present invention is featured in an electromagnetic induction type encoder including a number of scale coils arranged on the scale along the measurement direction, transmitting coils and receiving coils disposed on a grid relatively movable in the measurement direction with respect to the scale, which encoder detects the relative movement amount of the scale and grid from changes in magnetic fluxes detected by the receiving coil via the scale coil when the transmitting coil is magnetized, wherein a plurality of sets of the transmitting coils, the receiving coils and the scale coils are disposed symmetrically with respect to the center of the scale, scale coils of one set located at a symmetrical position with respect to the center of the scale is positioned with ½ phase of the scale pitch shifted in connection to scale coils of the other set, thereby solving the problem.

Here, the receiving coils can be connected to each other so as to acquire a difference in output between two receiving coils located at symmetrical positions around the center of the scale when causing an electric current to flow in the same direction as the transmitting coils.

Alternatively, the receiving coils can be connected to each other so as to acquire the sum of output of two receiving coils located at symmetrical positions around the center of the scale when causing an electric current to flow in a different direction from the transmitting coils.

Here, the number of grid layers may be made double.

Also, the connection wiring of the scale coils may be omitted.

Also, the shapes of a plurality of sets of the transmitting coils and the receiving coils may be made common to each other.

Also, the shape of the scale coil may be made rectangular frame-like.

Also, the shape of the transmitting coils may be made rectangular.

Also, the shape of the receiving coils may be made rhomboid.

Also, the transmitting coils may be disposed so as to surround the receiving coils.

According to the invention, it is not necessary to dispose the receiving coils between the transmitting coils as in Patent Document 2 when canceling the offset due to a magnetic field generated by the transmitting coils, and since the signal intensity can be increased by shortening the wiring length of the scale coil, a highly accurate electromagnetic induction type encoder, which is small-sized, has less error in position and is durable against water and oil, can be obtained.

Also, since the transmitting coils and the receiving coils are symmetrically disposed with respect to the center of the scale, the encoder is durable against fluctuations in the yaw direction.

Further, although three layers are required as the grid in Patent Document 2, only two layers are sufficient in the present invention. The grid can be made inexpensive by reducing the number of layers of the grid substrates.

Still further, the connection wiring 18 of the scale coil, which is required in the art of Patent Document 2, is no longer required, an inexpensive scale can be provided by lightening the design rule.

Also, by slipping the scale coil by ½ wavelength, the wiring area on the grid can be reduced, wherein a small-sized encoder can be provided.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, with reference to the drawings, a detailed description is given of embodiments of the invention.

Figure 1:
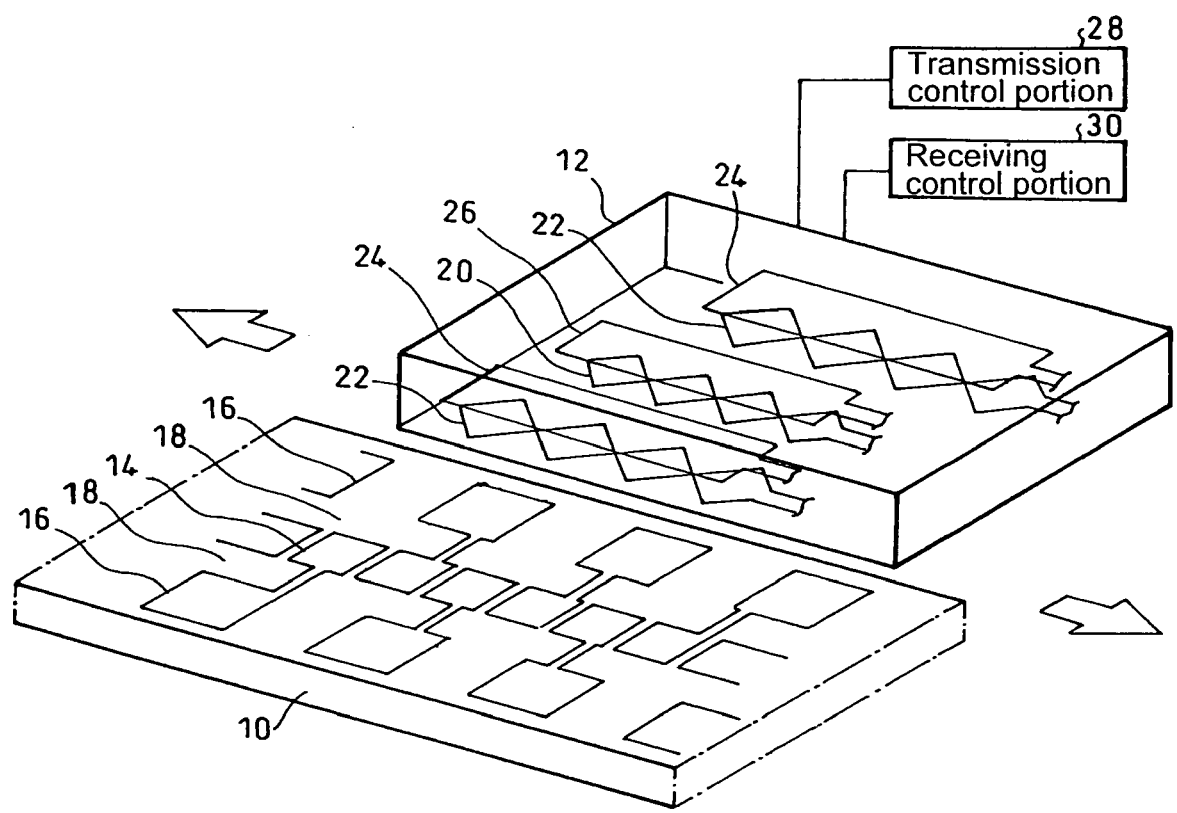
FIG. 1 is a perspective view showing the entire configuration of a prior art electromagnetic induction type encoder described in Patent Document 2.
Figure 2:
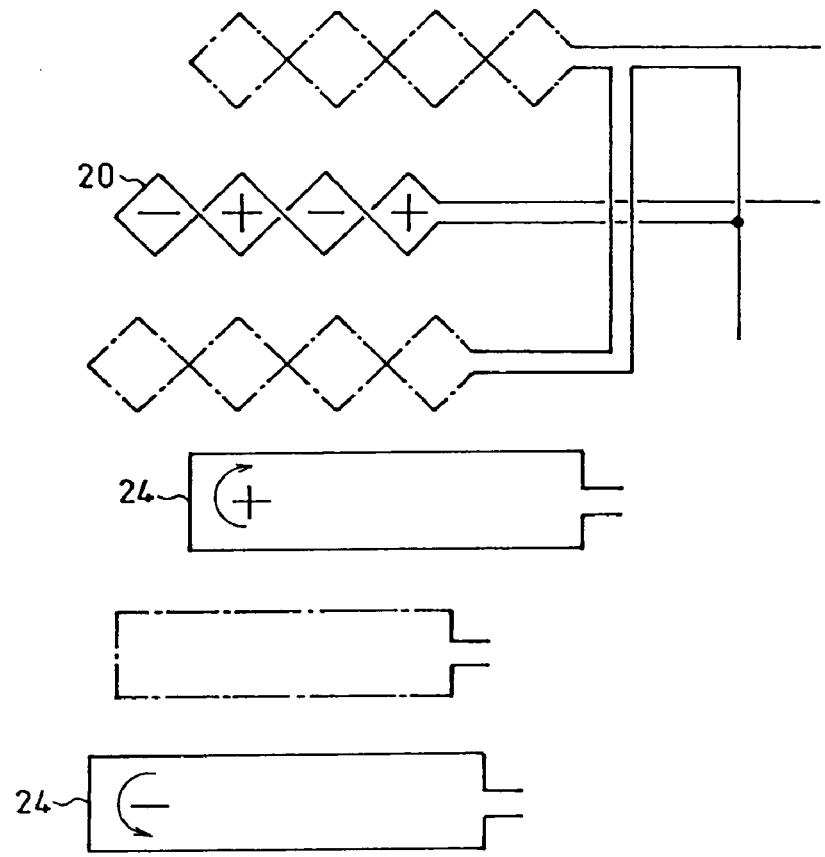
FIG. 2 are plan views showing the disposition of coils on the grid according thereto and the first action thereof.
Figure 2:
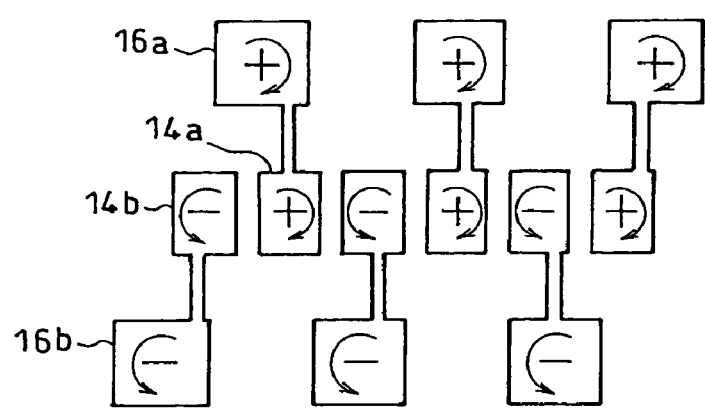
Figure 3:
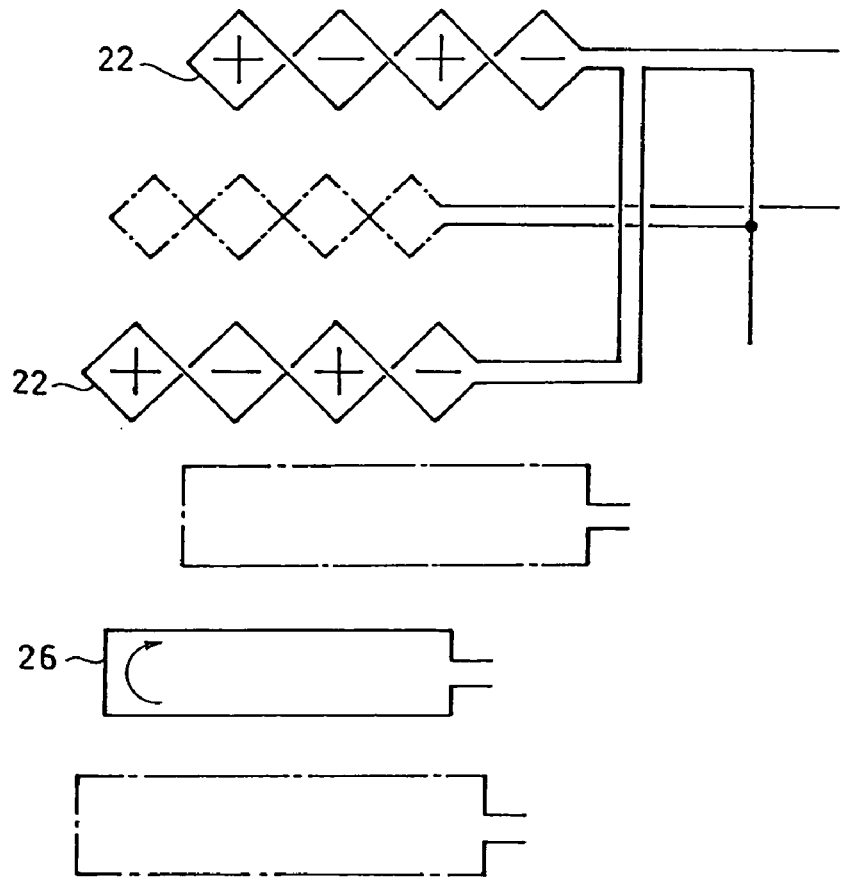
FIG. 3 are plan views showing the disposition of coils on the grid according thereto and the second action thereof.
Figure 3:
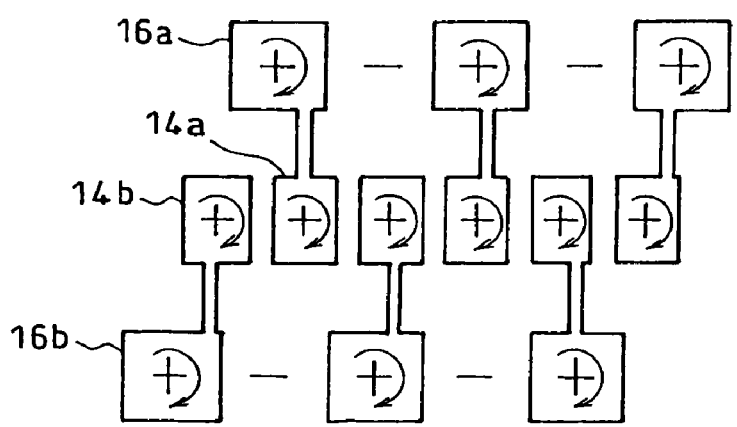
Figure 4:
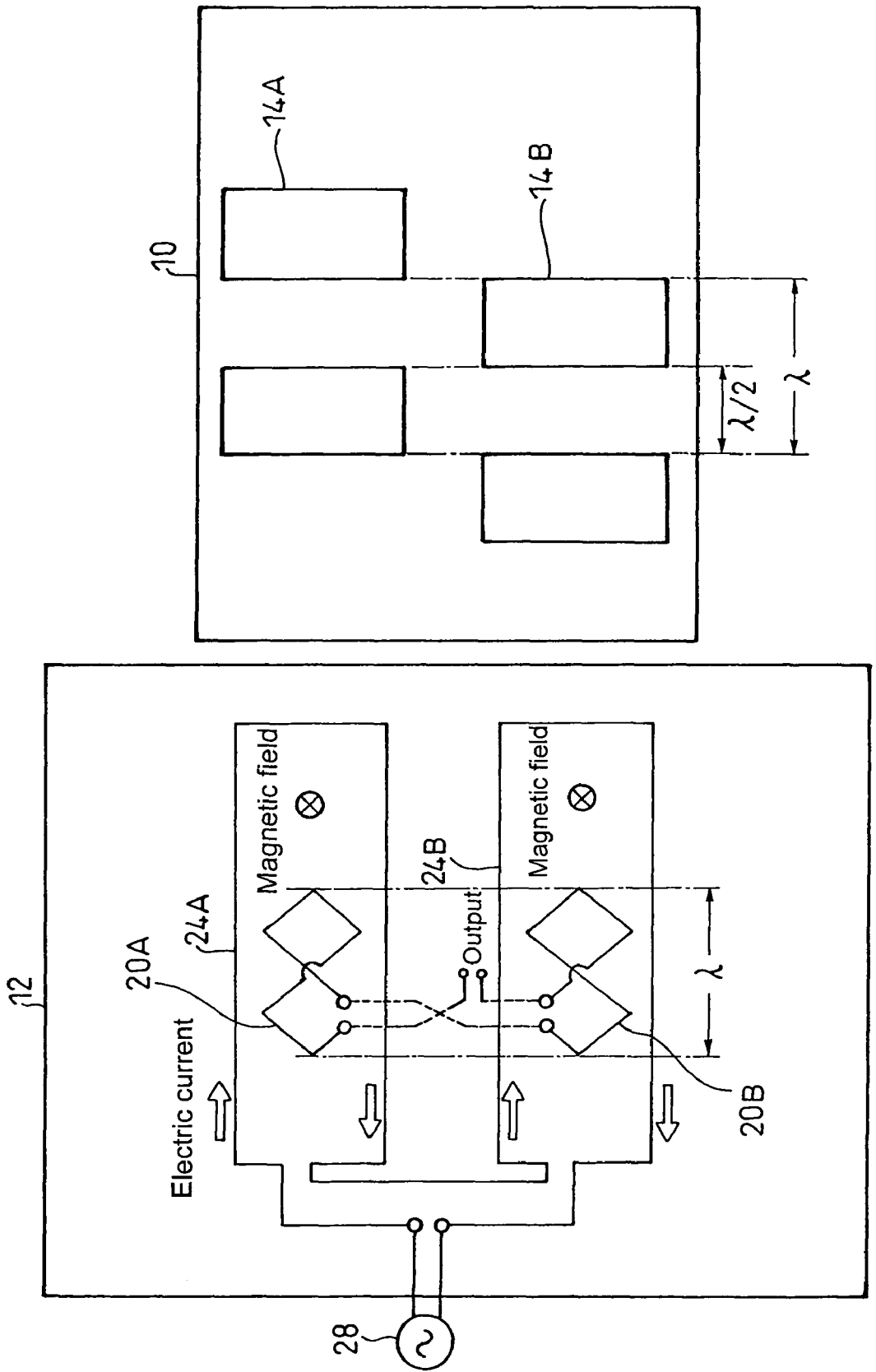
FIG. 4 are plan views showing a grid and a scale according to Embodiment 1 of the present invention.

As shown in FIG. 4, Embodiment 1 of the present invention is such that transmitting coils 24A, 24B and the receiving coils 20A, 20B on the same grid 12 and scale coils 14A, 14B on the scale 10 are disposed by two sets each symmetrically with respect to the center of the scale 10, and scale coil 14A of one set is shifted by ½ phase of the scale pitch (λ) with respect to scale coil 14B of the other set.

The shapes of two sets of transmitting coils 24A, 24B and the receiving coils 20A, 20B are made common to each other, and are connected so that an electric current flows to the transmitting coils 24A, 24B in the same direction and a difference in signals of the receiving coils 20A, 20B is output.

Figure 5:
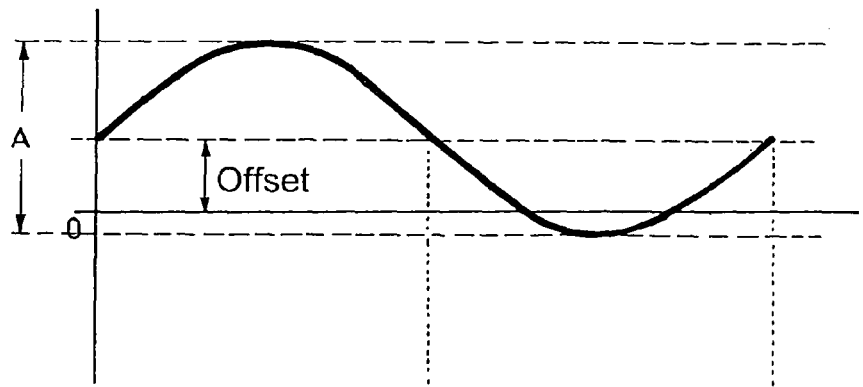
FIGS. 5(A) and (B) are views showing examples of signals of respective receiving coils according to Embodiment 1, and (C) is a view showing an example of signals, for which the offset is cancelled, according thereto.
Figure 5:
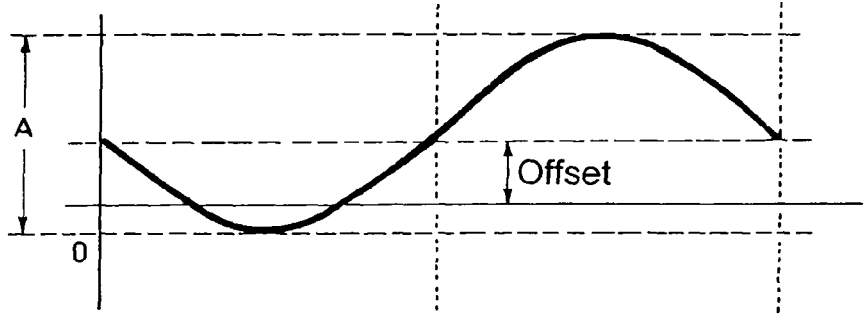
Figure 5:
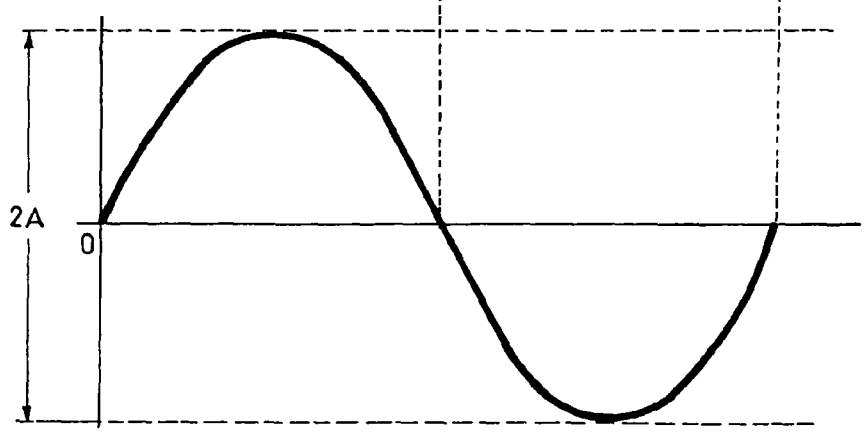

As shown by the arrows in FIG. 4, where an electric current flows to the two transmitting coils 24A, 24B in the same direction, magnetic fields are brought about at the transmitting coils 24A, 24B in the same direction. Here, since the phases of the scale coils 14A, 14B are shifted by λ/2, signals having the waveform of inverted polarities, on which the same offset is given, appear in the receiving coils 20A, 20B as shown in FIGS. 5(A) and (B). Therefore, as shown in FIG. 4, by connecting the two receiving coils 20A, 20B to each other so as to eliminate the difference in signals, a signal for which the offset is cancelled can be obtained as shown in FIG. 5(C).

Figure 6:
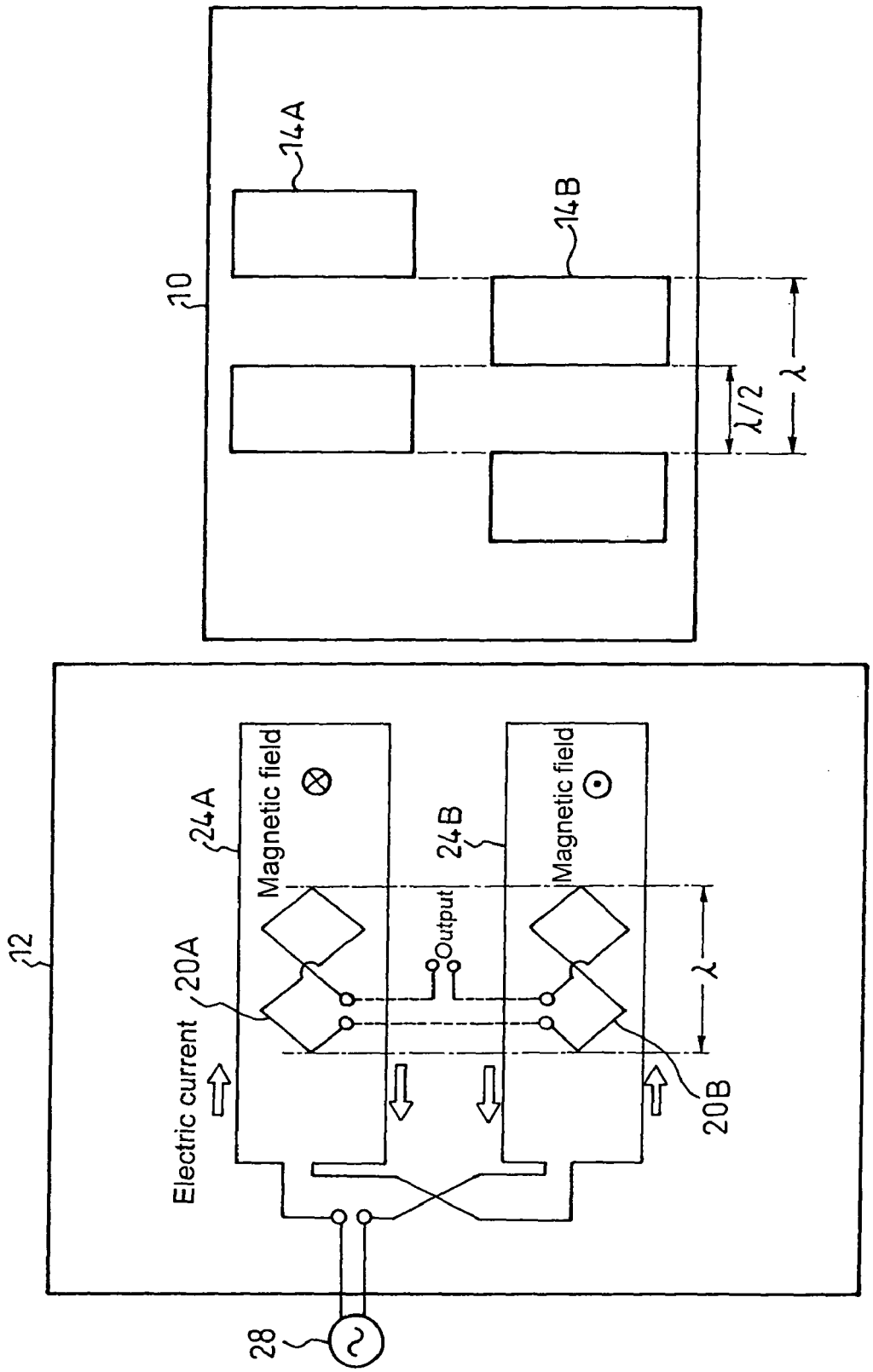
FIG. 6 are plan views showing a grid and a scale according to Embodiment 2 of the present invention.

Next, a description is given of Embodiment 2 of the present invention. The present embodiment is such that, as shown in FIG. 6, an electric current flows to the transmitting coils 24A, 24B in the reverse direction, and the transmitting coils 24A, 24B and the receiving coils 20A, 20B are connected so as to output the sum of signals of the receiving coils 20A, 20B.

Figure 7:
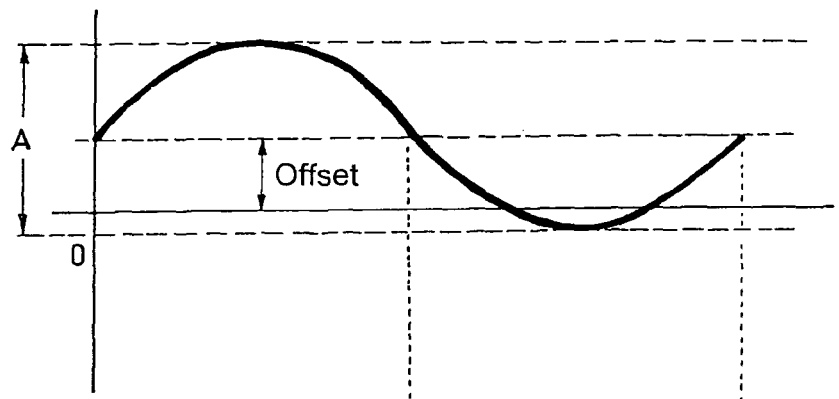
FIGS. 7(A) and (B) are views showing examples of signals of respective receiving coils according to Embodiment 2, and (C) is a view showing an example of signals, for which the offset is cancelled, according thereto.
Figure 7:
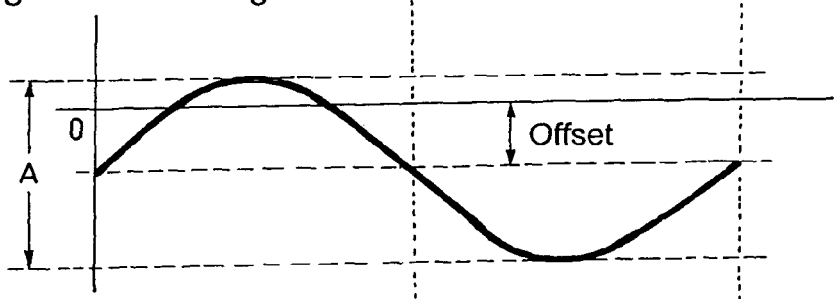
Figure 7:
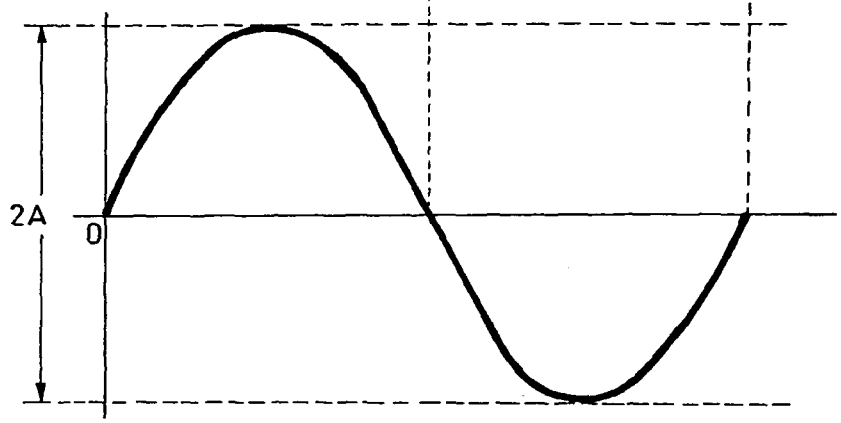

As in the present embodiment, where an electric current is caused to flow to the transmitting coils 24A, 24B in the opposite direction, magnetic fields are brought about in the opposite direction, respectively. At this time, as shown in FIGS. 7(A) and (B), a signal for which offset having different polarities is given on the same waveform is obtained in the receiving coils 20A, 20B. Therefore, by connecting the receiving coils 20A, 20B so that the signals of the two receiving coils 20A, 20B are added to each other, it is possible to obtain a signal for which the offset is cancelled, as shown in FIG. 7(C).

Also, in either of the above embodiment, although the shapes of the receiving coils are made rhomboid, the shapes thereof are not limited thereto. For example, the shape may be sinusoidal or a shape similar thereto.

In addition, in either of the above embodiments, although the scale coil is made rectangular frame-like, the shape of the scale coil is not limited to a rectangular frame. For example, it may be shaped so as to be like a plate in which polarities are provided in a rectangle.

Also, although, in the above embodiments, one set of the receiving coils is provided in the measurement direction (the left and right direction of FIG. 4 and FIG. 6), the receiving coils may be used for direction discrimination if another set thereof is provided, for example, with the phase thereof shifted by 90 degrees, or three-phase signals are obtained if three sets thereof are disposed with the phases thereof shifted by 120 degrees, respectively, and they may be used for an interpolation calculation.

Alternatively, not two sets but four sets of transmitting coils, receiving coils and scale coils are provided in the width direction of the scale (that is, the up and down direction in FIG. 4 and FIG. 6), and they may be composed of four rows.

The invention can be applied not only to inexpensive encoders but also general electromagnetic induction type encoders.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An electromagnetic induction type encoder comprising:
a number of scale coils arrayed on a scale along the measurement direction;
transmitting coils and receiving coils that are disposed on a grid relatively movably in the measurement direction with respect to the scale,
which encoder detects a relative movement amount of the scale and the grid from changes in magnetic fluxes detected by the receiving coils via the scale coil when the transmitting coils are magnetized;
wherein a plurality of sets of the transmitting coils, the receiving coils and the scale coils are disposed symmetrically with respect to the center of the scale, and
scale coils of one set located at a symmetrical position around the center of the scale is disposed with ½ phase of the scale pitch shifted with respect to scale coils of the other set.

2. The electromagnetic induction type encoder according to claim 1, wherein the receiving coils are connected to each other so as to obtain a difference in output of two receiving coils located at a symmetrical position with respect to the center of the scale when causing an electric current to flow to the transmitting coils in the same direction.

3. The electromagnetic induction type encoder according to claim 1, wherein the receiving coils are connected to each other so as to obtain the sum of output of two receiving coils located at a symmetrical position with respect to the center of the scale when causing an electric current to flow to the transmitting coils in a different direction.

4. The electromagnetic induction type encoder according to claim 1, wherein the number of grid layers is double.

5. The electromagnetic induction type encoder according to claim 1, wherein connection wiring of the scale coil is omitted.

6. The electromagnetic induction type encoder according to claim 1, wherein the shape of a plurality of sets of transmitting coils and receiving coils are made common to each other.

7. The electromagnetic induction type encoder according to claim 1, wherein the shape of the scale coils is made rectangular frame-like.

8. The electromagnetic induction type encoder according to claim 1, wherein the shape of the transmitting coils is made rectangular.

9. The electromagnetic induction type encoder according to claim 1, wherein the shape of the receiving coils is made rhomboid.

10. The electromagnetic induction type encoder according to claim 1, wherein the transmitting coils are disposed so as to surround the receiving coils.

* * * * *